United States Patent [19]

Bluege

[11] Patent Number: 5,076,348
[45] Date of Patent: Dec. 31, 1991

[54] SOLID-TO-LIQUID PHASE CHANGE COOLED MIRROR ARRANGEMENT

[75] Inventor: John Bluege, Lake Park, Fla.

[73] Assignee: United Technologies Corporation, Hartford, Conn.

[21] Appl. No.: 625,407

[22] Filed: Dec. 11, 1990

Related U.S. Application Data

[62] Division of Ser. No. 469,977, Jan. 25, 1990, Pat. No. 5,022,746.

[51] Int. Cl.⁵ .............................................. F28D 20/00
[52] U.S. Cl. ................................ 165/104.17; 165/902; 62/330
[58] Field of Search ............................. 165/104.17, 902; 62/330

[56] References Cited

U.S. PATENT DOCUMENTS 3,780,356 12/1973 Laing .................................. 165/902
4,415,234 11/1983 Meyers ................................ 350/609

Primary Examiner—Albert W. Davis, Jr.
Attorney, Agent, or Firm—Peter R. Ruzek

[57] ABSTRACT

A phase change material cooled mirror arrangement includes a mirror substrate which has a reflective front major surface and a rear major surface. The mirror is cooled by advancing at least one rod of a solid phase change material toward the rear major surface of the mirror substrate for gradual melting of the material at the rear major surface by heat absorbed from the substrate with attendant cooling of the latter, at an advancement speed sufficient for the solid phase change material to make up for the amount of such material that has been transformed into liquid by the melting thereof. The liquid phase change material is then removed from the vicinity of the substrate and possibly resolidified and added to the trailing end of the rod in a recirculating system.

5 Claims, 1 Drawing Sheet

SOLID-TO-LIQUID PHASE CHANGE COOLED MIRROR ARRANGEMENT

This is a division of copending application Ser. No. 469,977 filed on Jan. 25, 1990 now U.S. Pat. No. 5,022,746 granted June 11, 1991.

DESCRIPTION

1. Technical Field

The present invention relates to cooled mirrors in general, and more particularly to mirrors to be used for reflecting high energy laser beams.

2. Background Art

There are already known various constructions of mirror arrangements, among them such in which the substrate provided with the reflecting surface of the mirror is actively cooled by bringing a liquid cooling medium flow in intimate contact therewith. Actively cooled mirrors of this kind are often used in mirror arrangements for reflecting high energy laser beams, especially because such high energy laser mirrors require high dimensional stability under thermal loading and the actively circulated cooling medium removes heat, which could otherwise distort or damage the mirror or other components of the mirror arrangement, from the mirror.

Standard actively cooled mirror designs usually employ subsurface cooling channels within or in the back of the mirror substrate, and a cooling medium, such as water, is forced to flow through such cooling channels to remove heat which might otherwise build up in the structure. To achieve a useful rate of heat transfer between the mirror substrate and the cooling medium and relatively rapid removal of the thus heated cooling medium from the vicinity of the cooled mirror, the liquid cooling medium is usually forced through the cooling channels at a relatively high speed and at a relatively high pressure relative to the ambient pressure. Typically, effective cooling of an actively cooled high energy laser mirror requires liquid cooling medium flow rates close to twenty gallons per minute. These flow conditions induce undesirable vibrations in and/or pressure related deformations of the cooled mirror or structure. The high pressure and coolant storage volume cause system logistical problems which reduce portability and efficiency. Moreover, as the cooling medium progresses through the respective cooling channel, its temperature rises due to both heat absorption from the mirror substrate and frictional heating. This temperature rise causes an uneven and uncontrollable thermal growth or mapping of the mirror substrate material which changes and degrades the figure or configuration of the reflective surface of the mirror. In addition, the most common coolant, water, is limited by its relatively low boiling point to a lower burnout flux than is often desired. Thus, it may be seen that the heretofore known cooled mirror structures suffer of many inherent drawbacks that, if not insurmountable, are very difficult to overcome.

On the other hand, it is known to use phase change materials to achieve cooling while minimizing the amount of the cooling medium used for such cooling. The so-called heat pipe (i.e. a cooling arrangement that supplies a cooling medium to the component to be cooled in its liquid state for evaporation at the component and subsequent removal of the vaporized cooling medium from the vicinity of the component) has long been successfully used in a variety of terrestrial and outer space applications. Unfortunately, such heat pipe concepts are limited in both performance and thermal flux capacity. Such devices have not yet been practically utilized in high or moderate flux, low distortion applications, such as in high-energy laser (HEL) beam loaded mirrors. This is in part due to dramatic drop in thermal conductivity when the liquid evaporates.

Accordingly, it is a general object of the present invention to avoid the disadvantages of the prior art.

More particularly, it is an object of the present invention to provide an actively cooled mirror arrangement which does not possess the disadvantages of the known arrangements of this kind.

Still another object of the present invention is so to develop the mirror arrangement of the type here under consideration as to improve the heat removal from the mirror substrate while simultaneously reducing or eliminating undesirable thermally and mechanically induced distortions thereof.

It is yet another object of the present invention to devise a mirror arrangement of the above type which improves the uniformity of the temperature distribution throughout the mirror substrate.

A concomitant object of the present invention is to design the actively cooled mirror arrangement of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in a phase change material cooled mirror arrangement which includes a mirror substrate having a reflective front major surface and a rear major surface; means for advancing at least one rod of a solid phase change material toward the rear major surface of the mirror substrate for gradual melting of the material at the rear major surface by heat absorbed from the substrate with attendant cooling of the latter, at an advancement speed sufficient for the solid phase change material to make up for the amount of such material that has been transformed into liquid by the melting thereof; and means for removing the amount of the liquid phase change material from the vicinity of the substrate.

A particular advantage of the cooled mirror arrangement of the present invention as described so far is that the transformation of the solid phase change material into the liquid phase change material takes place at the same temperature, so that the mirror substrate temperature during operation is also maintained virtually constant, and that the melting process results in the absorption of a considerable amount of heat from the substrate due to the high heat of fusion required to melt the solid phase change material.

BRIEF DESCRIPTION OF THE DRAWING

The present invention will be described in more detail below with reference to the accompanying drawing in which.

BEST MODE FOR CARRYING OUT THE INVENTION

Figure 1:
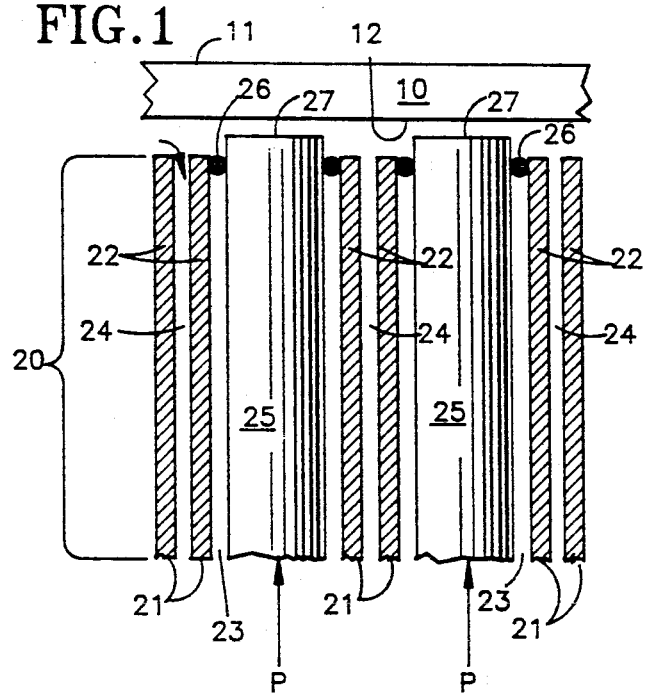
FIG. 1 is a somewhat simplified axial sectional view of a portion of an actively cooled mirror constructed in accordance with the present invention.

Referring now to the drawing in detail, and first to FIG. 1 thereof, it may be seen that the reference numeral 10 has been used therein to identify a mirror substrate or facesheet, of which only a relatively small portion is shown. The substrate 10 is of a material exhibiting a relatively high thermal conductivity and preferably also a low thermal expansion coefficient, such as of silicon, silicon carbide, molybdenum, and/or diamond. The substrate 10 has a front face 11 which is coated or otherwise provided with a reflecting surface, and a rear face 12 that faces in the opposite direction than the front face 10 and toward a cooling medium supply arrangement of the present invention that is collectively identified by the reference numeral 20. Here again, only a portion of the cooling medium supply arrangement 20 that is substantially coextensive with the illustrated portion of the mirror substrate 10 is shown.

The cooling medium supply arrangement 10 includes a plurality of guiding walls 21 which extend toward but terminate a predetermined distance from the back face 12 of the mirror substrate 10, thus leaving respective clearances 22 between themselves and the back surface 12. In the illustrated mirror arrangement, the guiding walls 21 bound respective supply passages 23. The supply passages 23 may have any desired cross-sectional configurations, such as circular, hexagonal, rectangular, square, or triangular. The guiding walls 21 further bound between or within themselves respective liquid discharge ducts 24 that communicate with the respective clearances 22 and via the same with the respective adjacent supply passages 23.

Each of the supply passages 23 contains a rod 25 of a solid phase-change material. During the operation of the cooling arrangement 20, each of the rods 25 is acted upon, in a direction toward the mirror substrate 10, by a force P which may have the same magnitude for all or some of the rods 25, but which can also be of a different magnitude from one rod 25 to another, as desired or necessitated by the circumstances. This force P is exerted on the respective rod 25 by an advancing arrangement of any known construction, such as such that subjects the trailing end face of the respective rod 25, that is, the rod end face which is remote from and faces away from the mirror substrate 10, to a pressure exceeding that acting on a leading end face 27 of the respective rod 25. The respective force P tends to advance the associated rod 25 toward the mirror substrate 10. Sealing elements 26, such as O-rings of elastomeric material, not only seal the interfaces between the respective rods 25 and the adjacent walls 21, but also guide the rods 25 during their advancement through the passages 23. The sealing elements 26 are held in place in any known manner, such as by being bonded to the walls 22 or partially received in compatible grooves or recesses of the latter.

The material chosen for the rods 25 preferably is of the kind exhibiting a very high heat of transformation between its solid and liquid states or, as it is also known, heat of fusion. In addition, the rod material is preferably selected in such a manner that its temperature of phase change from solid to liquid, that is its melting point or range, is within the desired operating temperature range of the mirror substrate 10. Examples of materials possessing the above-enumerated properties are gallium and certain gallium alloys. Thus, when the mirror substrate 10 is preconditioned to a temperature just below the melting point of the material of the rods 25 (e.g. to about 30° C. when the rods 25 are of gallium), the material of each of the rods 25 absorbs heat energy from the mirror substrate 10 during the operation of the mirror arrangement, especially after the temperature at any region of the rear face 12 of the substrate 10 has risen to or just slightly above the melting point of the rod material.

This heat absorption by the rod material takes place without change in the temperature of the rod material (and, by extension, of the associated region of the mirror substrate 10) as the material of the leading end portion of the respective rod 25 melts. The amount of heat absorbed by the rod material during this solid-to-liquid phase change is quite high (for instance, the heat of fusion of gallium is 470 J/cm$^3$), thus reducing the amount of the cooling medium that is to be brought into the vicinity of the substrate 10 to a minimum. The low flow rate allows a great reduction in the pressure required. The melting process is very gradual and nonviolent, and usually results in the formation of a thin film of the liquid phase-change material between the leading end face 27 of the respective rod 25 and the rear face 12 of the mirror substrate 10, thus keeping them slightly apart and forming escape routes for the liquid material to the respective clearances 22 and from there into the respective liquid discharge ducts 24.

In most instances, the liquid phase-change material is removed from the vicinity of the substrate 10 and into and through the liquid discharge ducts 24 due to the small and uniformly distributed overpressure existing in the liquid phase-change material as a result of the action of the forces P on the rods 25. However, this liquid removal may be further enhanced, or even caused, by the application of an underpressure to the downstream ends of the respective liquid discharge ducts 24, that is, to the ends thereof that are remote from the substrate 10. It is contemplated by the present invention to make the walls 22, or at least the portions thereof that surround the liquid discharge ducts 24, of a thermally insulating material when it is desired to assure that the liquid phase change material, which is at a temperature coinciding with or only slightly above the melting point, does not solidify in the ducts 24. Another advantage of this thermal insulation is that it avoids premature melting of the solid material of the rods 25 before it reaches the vicinity of the mirror substrate 10.

It will be appreciated that the forces P advance the respective rods 25 toward the substrate 10 to the extent necessary to make up for the amount of the solid material that has melted in the vicinity of the substrate 10, thus keeping the thickness of the liquid film virtually constant and furnishing additional amounts of the phase change material available for melting at the substrate 10. It is also to be noted that the phase-change material, such as gallium, is chosen due to its relatively high thermal conductivity both in the solid and liquid phases. As a result of this, not only is the pressure acting on the rear face 12 of the substrate 10 virtually invariable because of the gradualness of the melting process, but also the temperature of the substrate 10 is maintained at substantially the same level close to the melting point or range of the phase change material due to the steady availability of additional solid phase change material in close proximity of the rear face 12 of the substrate 10. Taken together; these features of the approach taken by the present invention assure the minimization of the mirror substrate deformation or distortion, and especially of the so-called phase jitter.

Figure 2:
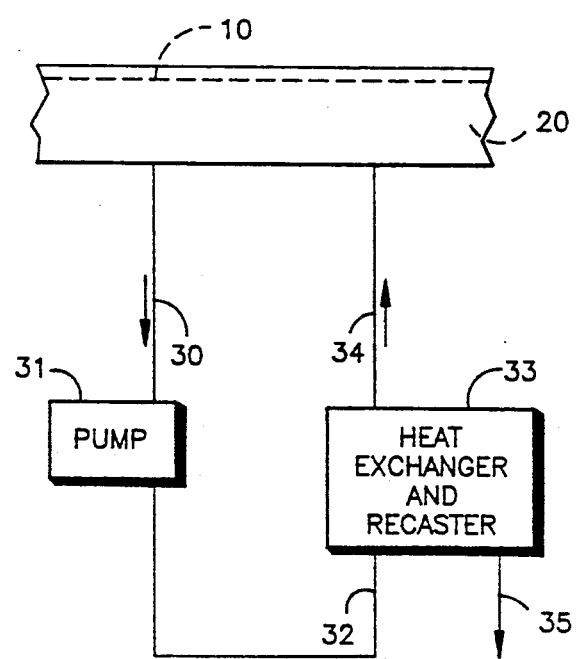
FIG. 2 is a diagrammatic view of an example of a cooling medium recirculating arrangement of the present invention as used in conjunction with the cooled mirror of FIG. 1.

The liquid phase-change material emerging from the downstream ends of the liquid discharge ducts 24 can be discarded or conveyed to a destination remote from the mirror arrangement for storage or further use, if the mirror arrangement is completely passive. However, this discharged liquid may also be immediately recirculated and reused in the cooling arrangement 20, for instance in a manner that is illustrated in a diagrammatic and simplified fashion in FIG. 2 of the drawing. As shown there, the liquid phase change material discharged from the cooling arrangement 20 is conveyed through a discharge conduit 30 (which may also be thermally insulated) to an inlet of a pump 31, and the liquid phase change material discharged by the outlet of the pump 31 is fed through a feeding conduit 32 to a heat exchanger and recaster 33, where the previously absorbed heat (including the heat of fusion and preferably more) is extracted from the phase change material so that it solidifies and is added to the trailing ends of the rods 25. The advancement of the respective rod 25 from the heat exchanger and recaster 33 to the cooling arrangement 20 is indicated by a line 34, while the removal of heat from the heat exchanger and recaster 33 is indicated at 35.

Several aspects of this approach taken by the present invention contribute to the minimized thermo-optic distortion of the mirror substrate 10. For one, the thermal impedances are kept very low by using a phase change material with a relatively high thermal conductivity, such as the aforementioned gallium or gallium alloys. Secondly, since the solid-to-liquid transformation occurs with no change in the temperature of the phase change material, and thus with only an insignificant change in the temperature of the substrate 10, if any, virtually no thermal distortion is induced in the substrate 10 by temperature variations thereof. Due to the intimate contact of the liquid phase change material both with the solid phase change material of the respective rod 25 and with the rear face 12 of the substrate 10 (which may be coated with an appropriate, well known, coating to promote wetting), the heat transfer impedances are negligible. Thus, the only meaningful thermal impedances are those due to conduction through the solid substrate 10 between its faces 11 and 12, and due to conduction through and convection within the thin liquid layer present between the rear face 12 of the substrate 10 and the leading end face 27 of the respective rod 25, but they, too, are virtually negligible, especially since they remain virtually constant so that the mirror substrate 10 and the cooling arrangement are being operated in a steady equilibrium. The thickness of the aforementioned thin layer of phase change material liquid is essentially independent of thermal load and remains virtually constant, inasmuch as the excess liquid is being continuously withdrawn or discharged, and the respective rods 25 are being commensurately advanced.

Another advantage of the above-discussed approach is that it is inherently fail-safe, due to its insensitivity to boiling burnout which poses a great risk in cooling systems employing liquid coolants and which is encountered when the mirror substrate, or certain regions thereof, are heated to such a temperature that the cooling liquid behind the mirror substrate rapidly evaporates and thus interferes with efficient heat removal from the substrate. In the mirror arrangement of the present invention, the possibility of such a boiling burnout is so remote as to be virtually nonexistent, inasmuch as the phase change material continues to absorb heat from the substrate 10 at a considerable rate even if allowed to remain behind the substrate 10 in its liquid form. So, for instance, when using gallium as the material of the rods 25, it absorbs heat from the substrate, when in its liquid form, at a rate of 0.6 J/cm$^3$ until it reaches its evaporation point at about 2030° C. Thus, it ought to be clear that the phase change material is effectively immune to catastrophic failure (unlike water and other single phase or liquid-to-vapor phase change cooling fluids) and that boiling burnout is extremely unlikely in the temperature range for which the mirror arrangement is designed.

To give an example of a practical application of the above approach, a 10 cm×10 cm passive silicon or silicon carbide mirror subjected to 0.1% absorption of a 1 MW flat-top laser beam incurs mapping distortion of less than 0.005 micrometers when the mirror substrate is 0.15 cm thick and the liquid phase change material layer has a thickness of 0.01 cm, and when using a high volume fraction gallium rod array. Under these circumstances, with a gallium rod material consumption rate of 1 cm in about 47 seconds, less than 1" of gallium is needed for a 100 second 1 MW mission. In the actively cooled mode (with recirculation akin to that depicted in FIG. 2), the flow rate is about 2 cm$^3$/sec (0.03 gpm) for the above case, which is several orders of magnitude lower than that required for current designs. Such a flow rate can be easily handled by a small electrically powered peristaltic or MHD pump.

In addition to the substantial increase in basic performance, the relatively low flow rate reduces the need for high pressure and high volume storage and duct work, and almost eliminates flow jitter. The approach taken by the present invention also renders it possible to use less standard (and less expensive) materials for the mirror substrate, such as glass, which materials would not otherwise be considered for cooled applications because of their mechanical properties (such as in large mirrors subjected to moderate thermal loading).

While the present invention has been illustrated and described as embodied in a particular construction of a mirror and of an associated cooling arrangement employing an array of rods of solid-to-liquid phase change material, it will be appreciated that the present invention is not limited to this particular example; rather, the scope of protection of the present invention is to be determined solely from the attached claims.

I claim:

1. A cooling arrangement for cooling a heat absorbing component, comprising
   means for advancing at least one rod of a solid phase change material toward the component for gradual melting of said material at the component by heat absorbed from the component with attendant cooling of the latter, at an advancement speed sufficient for the solid phase change material to make up for the amount of such material that has been transformed into liquid by the melting thereof;
   means for removing said amount of the liquid phase change material from the vicinity of the component; and
   means for replenishing said solid phase change material of said rod, including means for adding a replenishment amount of said solid phase change material that is sufficient to make up for the removed amount of said liquid phase change material to an end portion of said rod that is remote from said component.

2. The cooling arrangement as defined in claim 1, wherein said advancing means includes means for confining said rod for advancement in a predetermined path toward the component; and further comprising sealing means interposed between said rod and said confining means.

3. The cooling arrangement as defined in claim 2, wherein said removing means includes at least one passage in said confining means.

4. The cooling arrangement as defined in claim 1, wherein said replenishing means includes means for recirculating said phase change material, including means for cooling said liquid phase change material to below said melting point thereof to transform the same into said solid phase change material to be added by said adding means to said end portion of said rod.

5. The cooling arrangement as defined in claim 1, wherein said advancing means is further operative for advancing at least one additional solid phase change material rod to a region of the component that adjoins that to which said advancing means advances said one rod.

* * * * *